United States Patent
Thompson et al.

(10) Patent No.: US 7,798,905 B2
(45) Date of Patent: *Sep. 21, 2010

(54) METHOD AND APPARATUS FOR ASSOCIATING DATA WITH ONLINE GAME RATINGS

(75) Inventors: Gary Thompson, Seattle, WA (US);
Benjamin O. Zotto, Seattle, WA (US);
Brent E. Curtis, Bellevue, WA (US);
Daniel Caiafa, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1721 days.

This patent is subject to a terminal disclaimer.

(21) Appl. No.: 10/435,532

(22) Filed: May 9, 2003

(65) Prior Publication Data
US 2004/0225386 A1 Nov. 11, 2004

(51) Int. Cl.
*A63F 13/00* (2006.01)
(52) U.S. Cl. ............... 463/42; 463/40; 463/41; 463/6
(58) Field of Classification Search .............. 463/43, 463/1, 6, 40–42, 30, 31, 32, 23
See application file for complete search history.

(56) References Cited

U.S. PATENT DOCUMENTS

| | | | |
|---|---|---|---|
| 5,269,687 A | 12/1993 | Mott et al. | |
| 5,354,202 A | 10/1994 | Moncrief et al. | |
| 5,577,913 A | 11/1996 | Moncrief et al. | |
| 5,791,992 A | 8/1998 | Crump et al. | |
| 6,010,403 A | 1/2000 | Adam et al. | |
| 6,149,519 A | 11/2000 | Osaki et al. | |
| 6,386,979 B1 * | 5/2002 | Ho et al. ................. | 463/43 |
| 6,468,160 B2 | 10/2002 | Eliott | |
| 6,488,505 B1 * | 12/2002 | Hightower ................ | 434/69 |
| 6,699,127 B1 | 3/2004 | Lobb et al. | |
| 6,712,704 B2 | 3/2004 | Eliott | |
| 6,755,654 B2 | 6/2004 | Hightower | |
| 6,769,989 B2 | 8/2004 | Smith et al. | |
| 7,214,133 B2 * | 5/2007 | Jen et al. ................. | 463/42 |
| 2002/0059406 A1 * | 5/2002 | Tanaka et al. ........... | 709/223 |
| 2002/0068629 A1 | 6/2002 | Allen et al. | |
| 2002/0142845 A1 * | 10/2002 | Randall Whitten et al. .... | 463/43 |
| 2003/0054869 A1 | 3/2003 | Hightower | |

(Continued)

FOREIGN PATENT DOCUMENTS

JP     2000000376 A     1/2000

(Continued)

OTHER PUBLICATIONS

"The DexDrive" Online; Nov. 18, 1998; www.ign.com; 5 pages.

(Continued)

*Primary Examiner*—Ronald Laneau
*Assistant Examiner*—Ross A. Williams
(74) *Attorney, Agent, or Firm*—Lee & Hayes, PLLC

(57) ABSTRACT

A procedure receives a game result from a game console. A rating is determined for the game result. If the rating for the game result meets a predetermined criteria, the recorded game associated with the game result is received from the game console. The recorded game is attached to the rating of the game result such that other players can access the recorded game through an online gaming service.

34 Claims, 8 Drawing Sheets

U.S. PATENT DOCUMENTS

| | | |
|---|---|---|
| 2004/0097287 A1 | 5/2004 | Postrel |
| 2004/0162137 A1 | 8/2004 | Eliott |
| 2005/0277472 A1 | 12/2005 | Gillan et al. |

FOREIGN PATENT DOCUMENTS

| | | |
|---|---|---|
| JP | 2000051518 A | 2/2000 |
| JP | 2001526550 T | 12/2001 |
| JP | 2002360935 A | 12/2002 |
| JP | 2003093746 A | 4/2003 |
| WO | WO9719537 | 5/1997 |
| WO | WO9719537 A1 | 5/1997 |
| WO | WO 01/05475 A1 | 1/2001 |
| WO | WO0105475 | 1/2001 |

OTHER PUBLICATIONS

Matko, et al: "Virtual Race as an Examination Test: Models, Solutions, Experiences"; IEEE Transactions on Education, vol. 44, No. 4, Nov. 2001; 0018-9359/01; pp. 342-347.

Mooney, et al; "CyberIST: a virtual game for medical education"; 1998 Carfax Publishing Ltd.; 0142-159X/98/030212-05; pp. 212-216.

Gran Turismo 3 A-spec:Instruction Manual. GT3 Released on Jul. 10, 2001. Scanned Copy. Retrieved from: The Game Manual Archive <http://www.gamemanuals.net/> 27 pages.

Notice of Rejection for Japanese Patent Application No. 2004-140403 mailed on Oct. 23, 2009, 7 pgs.

\* cited by examiner

| Rank | Player Name | Lap | Ref ID | Avail? | TimeStamp |
|------|-------------|------|--------|--------|-----------|
| 1 | John Doe | 1.02.50 | 00101 | Y | 03051725 |
| 2 | Master Gamer | 1.03.09 | 10449 | Y | 03121008 |
| 3 | Bob Smith | 1.03.11 | | | 02100946 |
| 4 | Jane Doe | 1.03.12 | 23998 | Y | 03051605 |
| 5 | Game Star | 1.03.22 | 48711 | N | 03131720 |
| 6 | Karen Smith | 1.03.40 | 09333 | Y | 03110625 |
| 7 | Joe Pilot | 1.03.55 | | | 02281052 |
| 8 | Fighter Bob | 1.03.72 | 22094 | N | 03131728 |
| 9 | Mary Jones | 1.03.81 | 44602 | Y | 03081140 |
| 10 | Dave Rider | 1.03.86 | 01196 | Y | 03112126 |

METHOD AND APPARATUS FOR ASSOCIATING DATA WITH ONLINE GAME RATINGS

TECHNICAL FIELD

The systems and methods described herein relate to gaming systems and, more particularly, to associating various data with a game player's online rating.

BACKGROUND

Traditionally, gaming systems accommodated a limited number of players, such as 1-4 players. A recent trend in gaming systems is to provide capabilities to facilitate gaming among multiple players over a network, such as Internet-based online gaming. These online gaming systems allow players to compete with other players, regardless of their geographic location.

An important challenge faced by game developers and game publishers is creating games that are enjoyable and challenging to play for a significant period of time. The best selling games are often those that provide incentives for players to keep playing the game for several months at a time. Online features can provide incentives for players to continue playing a particular game. For example, online statistics, such as top scores for a particular game, allow players to compete for "bragging rights" amongst the world's top players or amongst their friends.

Accordingly, it is desirable to provide additional online features that encourage gamers to continue playing a particular game.

SUMMARY

The systems and methods described herein allow data, such as recorded games or game highlights, to be attached to a players' ratings in an online gaming system. For example, an online statistics service keeps a reference to the attached data, which is stored in one or more servers or other data storage devices.

In a particular embodiment, a game result is received from a game console and a rating for the game result is determined. If the rating for the game result meets predetermined criteria, a recorded game associated with the rating is received from the game console. The recorded game is attached to the rating such that other players can access the recorded game through an online gaming service.

BRIEF DESCRIPTION OF THE DRAWINGS

Similar reference numbers are used throughout the figures to reference like components and/or features.

DETAILED DESCRIPTION

The following discussion is directed to a system and method for associating data with a user's online game rating. The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Discussions herein refer to a "rating", a "leaderboard" and an "attachment". A rating is a score assigned to a player or a team as a result of some aspect of gameplay. A leaderboard is a ranked collection of ratings that resulted from some aspect of gameplay stored in a statistics service. An attachment is any data associated with a rating on a statistics leaderboard. For example, an attachment may be a recorded game (also referred to as a "saved game"), a saved action or movement in a game, an audio file containing the voice of a player explaining how a high score was achieved, etc. An attachment may also be an aggregated collection of several items such as a recorded game and an audio file containing player commentary, etc. An attachment may also be referred to as "attached data" or "associated data".

Figure 1:
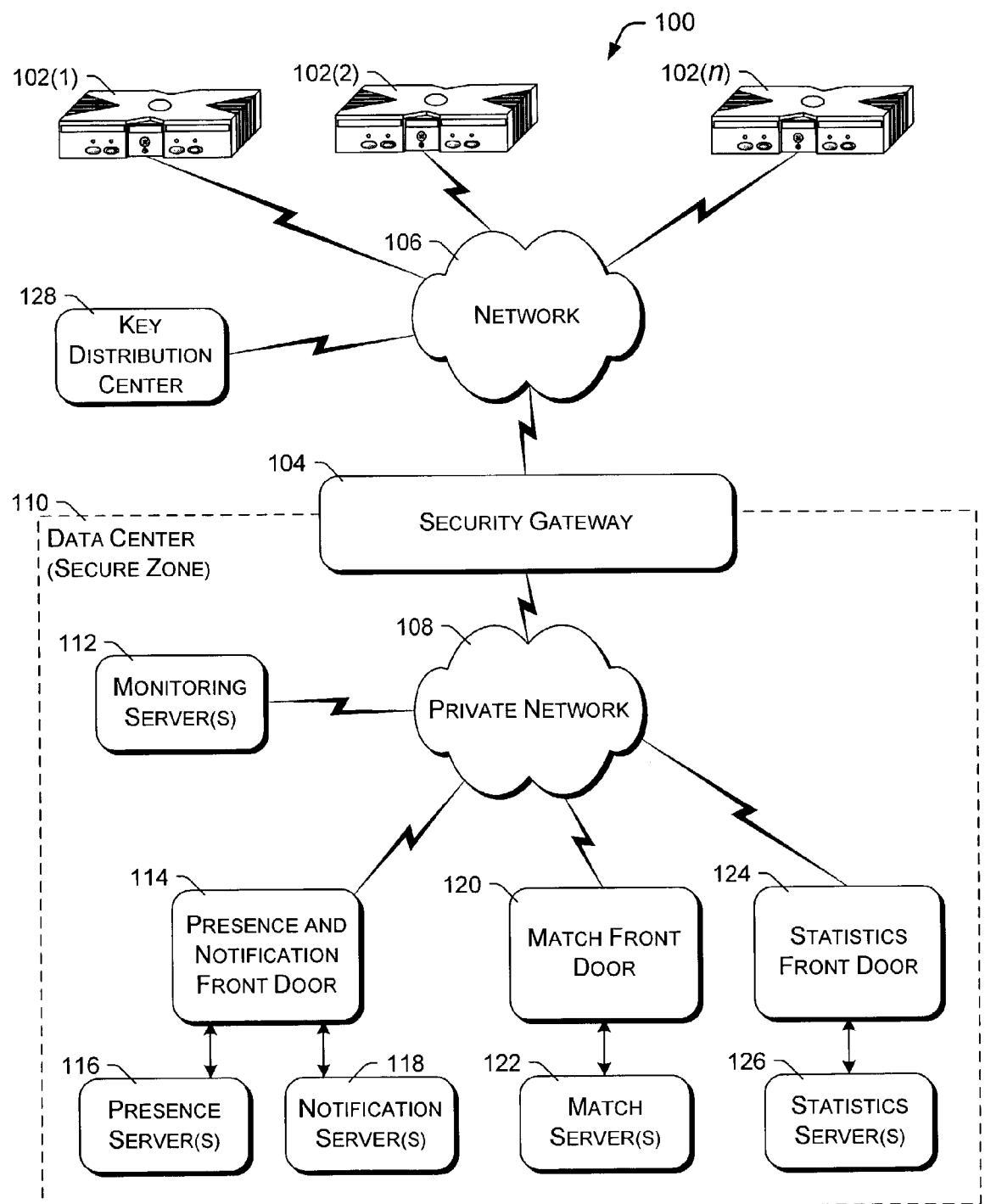
FIG. 1 is a block diagram of an exemplary online gaming environment.

FIG. 1 is a block diagram of an exemplary online gaming environment 100. Multiple game consoles 102(1), 102(2), . . . , 102(n) are coupled to a security gateway 104 via a network 106. Network 106 represents any one or more of a variety of conventional data communications networks. Network 106 will typically include packet switched networks, but may also include circuit switched networks. Network 106 can include wired and/or wireless portions. In one exemplary implementation, network 106 includes the Internet and may optionally include one or more local area networks (LANs) and/or wide area networks (WANs). At least a part of network 106 is a public network, which refers to a network that is publicly-accessible. Virtually anyone can access the public network.

In some situations, network 106 includes a LAN (e.g., a home network), with a routing device situated between game console 102 and security gateway 104. This routing device may perform network address translation (NAT), allowing the multiple devices on private network 108 (or a LAN) to share the same IP address on the Internet, and also operating as a firewall to protect the device(s) from access by malicious or mischievous users via the Internet.

Security gateway 104 operates as a gateway between public network 106 and private network 108. Private network 108 can be any of a wide variety of conventional networks, such as a local area network. Private network 108, as well as other devices discussed in more detail below, is within a data center 110 that operates as a secure zone. Data center 110 is made up of trusted devices communicating via trusted communications. Thus, encryption and authentication within secure zone 110 is not necessary. The private nature of network 108 refers to the restricted accessibility of network 108—access to network 108 is restricted to only certain individuals (e.g., restricted by the owner or operator of data center 110).

Security gateway 104 is a cluster of one or more security gateway computing devices. These security gateway computing devices collectively implement security gateway 104.

Security gateway 104 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 110 are: one or more monitoring servers 112; one or more presence and notification front doors 114, one or more presence servers 116, and one or more notification servers 118 (collectively implementing a presence and notification service); one or more match front doors 120 and one or more match servers 122 (collectively implementing a match service); and one or more statistics front doors 124 and one or more statistics servers 126 (collectively implementing a statistics service). The servers 116, 118, 122, and 126 provide services to game consoles 102, and thus can be referred to as service devices. Other service devices may also be included in addition to, and/or in place of, one or more of the servers 116, 118, 122, and 126. Additionally, although only one data center is shown in FIG. 1, alternatively multiple data centers may exist with which game consoles 102 can communicate. These data centers may operate independently or alternatively may operate collectively (e.g., to make one large data center available to game consoles 102).

Game consoles 102 are situated remotely from data center 110, and access data center 110 via network 106. A game console 102 desiring to communicate with one or more devices in data center 110 establishes a secure communication channel between the console 102 and security gateway 104. Game console 102 and security gateway 104 encrypt and authenticate data packets being passed back and forth, thereby allowing the data packets to be securely transmitted between them without being understood by any other device that may capture or copy the data packets without breaking the encryption. Each data packet communicated from game console 102 to security gateway 104, or from security gateway 104 to game console 102 can have data embedded therein. This embedded data is referred to as the content or data content of the packet. Additional information may also be inherently included in the packet based on the packet type (e.g., a heartbeat packet or traversal packet, discussed in more detail below).

The secure communication channel between a console 102 and security gateway 104 is based on a security ticket. Console 102 authenticates itself and the current user(s) of console 102 to a key distribution center 128 and obtains, from key distribution center 128, a security ticket. Console 102 then uses this security ticket to establish the secure communication channel with security gateway 104. In establishing the secure communication channel with security gateway 104, the game console 102 and security gateway 104 authenticate themselves to one another and establish a session security key that is known only to that particular game console 102 and the security gateway 104. This session security key is used as a basis to encrypt data transferred between the game console 102 and the security gateway cluster 104, so no other devices (including other game consoles 102) can read the data. The session security key is also used as a basis to authenticate a data packet as being from the security gateway 104 or game console 102 that the data packet alleges to be from. Thus, using such session security keys as a basis, secure communication channels can be established between the security gateway 104 and the various game consoles 102.

Once the secure communication channel is established between a game console 102 and the security gateway 104, encrypted data packets can be securely transmitted between the two. When the game console 102 desires to send data to a particular service device in data center 110, the game console 102 encrypts the data and sends it to security gateway 104 requesting that it be forwarded to the particular service device(s) targeted by the data packet. Security gateway 104 receives the data packet and, after authenticating and decrypting the data packet, encapsulates the data content of the packet into another message to be sent to the appropriate service via private network 108. Security gateway 104 determines the appropriate service for the message based on the requested service(s) targeted by the data packet.

Similarly, when a service device in data center 110 desires to communicate data to a game console 102, the data center sends a message to security gateway 104, via private network 108, including the data content to be sent to the game console 102 as well as an indication of the particular game console 102 to which the data content is to be sent. Security gateway 104 embeds the data content into a data packet, and then encrypts the data packet so it can only be decrypted by the particular game console 102 and also authenticates the data packet as being from the security gateway 104.

Although discussed herein as primarily communicating encrypted data packets between security gateway 104 and a game console 102, alternatively some data packets may be partially encrypted (some portions of the data packets are encrypted while other portions are not encrypted). Which portions of the data packets are encrypted and which are not can vary based on the desires of the designers of data center 110 and/or game consoles 102. For example, the designers may choose to allow voice data to be communicated among consoles 102 so that users of the consoles 102 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, the data packet is still authenticated.

Each security gateway device in security gateway 104 is responsible for the secure communication channel with typically one or more game consoles 102, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 112 operate to inform devices in data center 110 of an unavailable game console 102 or an unavailable security gateway device of security gateway 104. Game consoles 102 can become unavailable for a variety of different reasons, such as a hardware or software failure, the console being powered-down without logging out of data center 110, the network connection cable to console 102 being disconnected from console 102, other network problems (e.g., the LAN that the console 102 is on malfunctioning), etc. Similarly, a security gateway device of security gateway 104 can become unavailable for a variety of different reasons, such as hardware or software failure, the device being powered-down, the network connection cable to the device being disconnected from the device, other network problems, etc.

Each of the security gateway devices in security gateway 104 is monitored by one or more monitoring servers 112, which detect when one of the security gateway devices becomes unavailable. In the event a security gateway device becomes unavailable, monitoring server 112 sends a message to each of the other devices in data center 110 (servers, front doors, etc.) that the security gateway device is no longer available. Each of the other devices can operate based on this information as it sees fit (e.g., it may assume that particular game consoles being managed by the security gateway device are no longer in communication with data center 110 and perform various clean-up operations accordingly). Alternatively, only certain devices may receive such a message from the monitoring server 112 (e.g., only those devices that are concerned with whether security gateway devices are available).

Security gateway 104 monitors the individual game consoles 102 and detects when one of the game consoles 102 becomes unavailable. When security gateway 104 detects that a game console is no longer available, security gateway 104 sends a message to monitoring server 112 identifying the unavailable game console. In response, monitoring server 112 sends a message to each of the other devices in data center 110 (or alternatively only selected devices) that the game console is no longer available. Each of the other devices can then operate based on this information as it sees fit.

Presence server(s) 116 holds and processes data concerning the status or presence of a given user logged in to data center 110 for online gaming. Notification server(s) 118 maintains multiple queues of outgoing messages destined for a player logged in to data center 110. Presence and notification front door 114 is one or more server devices that operate as an intermediary between security gateway 104 and servers 116 and 118. One or more load balancing devices (not shown) may be included in presence and notification front door 114 to balance the load among the multiple server devices operating as front door 114. Security gateway 104 communicates messages for servers 116 and 118 to the front door 114, and the front door 114 identifies which particular server 116 or particular server 118 the message is to be communicated to. By using front door 114, the actual implementation of servers 116 and 118, such as which servers are responsible for managing data regarding which users, is abstracted from security gateway 104. Security gateway 104 can simply forward messages that target the presence and notification service to presence and notification front door 114 and rely on front door 114 to route the messages to the appropriate one of server(s) 116 and server(s) 118.

Match server(s) 122 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 120 includes one or more server devices (and optionally a load balancing device(s)) and operates to abstract match server(s) 122 from security gateway 104 in a manner analogous to front door 114 abstracting server(s) 116 and server(s) 118.

Statistics server(s) 126 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 126 includes one or more server devices (and optionally a load balancing device(s)) and operates to abstract statistics server (s) 126 from security gateway 104 in a manner analogous to front door 114 abstracting server(s) 116 and server(s) 118.

Thus, it can be seen that security gateway 104 operates to shield devices in the secure zone of data center 110 from the untrusted, public network 106. Communications within the secure zone of data center 110 need not be encrypted, as all devices within data center 110 are trusted. However, any, information to be communicated from a device within data center 110 to a game console 102 passes through security gateway cluster 104, where it is encrypted in such a manner that it can be decrypted by only the game console 102 targeted by the information.

Figure 2:
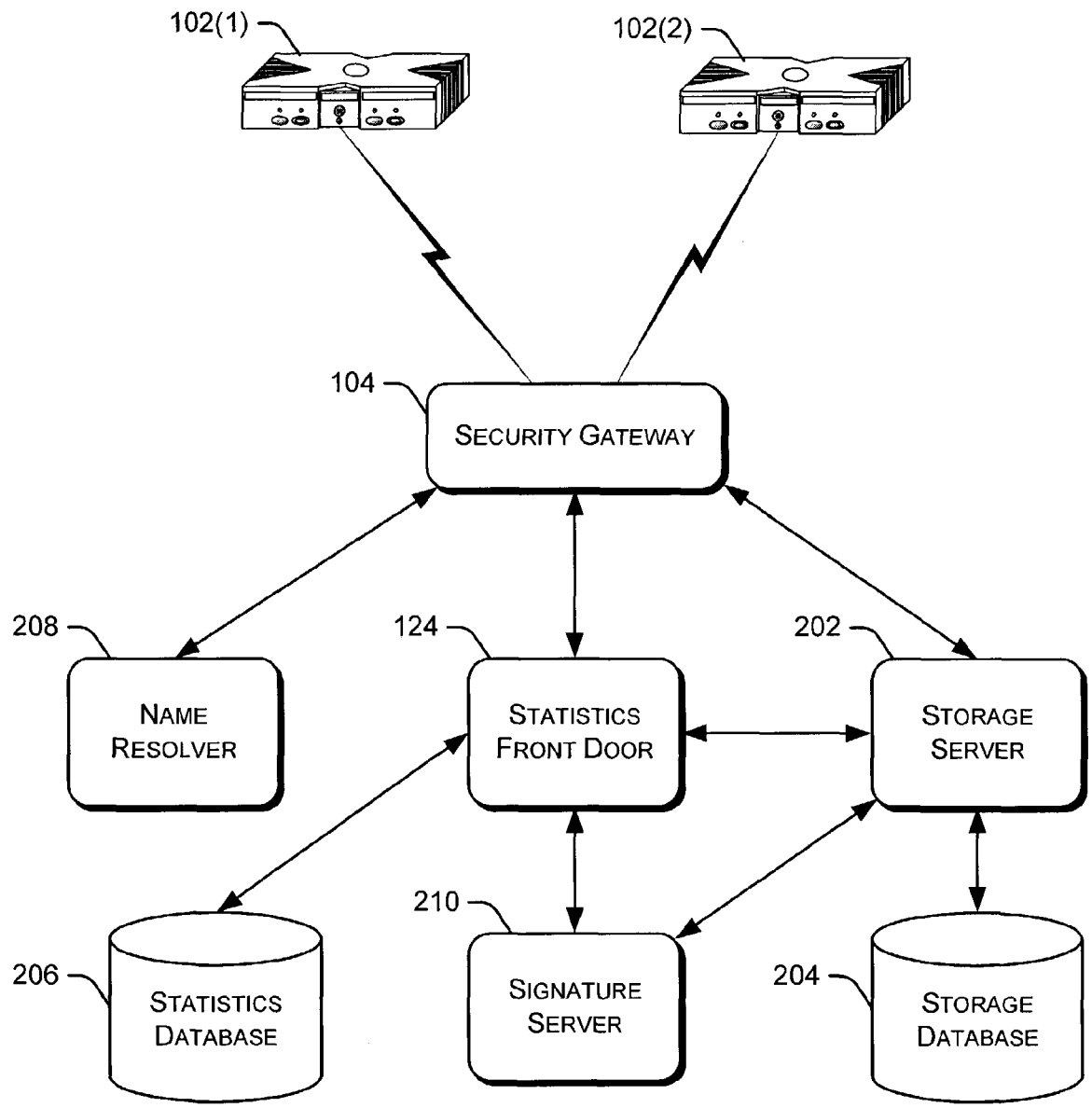
FIG. 2 is a block diagram illustrating specific components of a system for associating data with online game ratings.

FIG. 2 is a block diagram illustrating specific components of a system for associating data with online game ratings. Certain components (such as components of FIG. 1) are omitted from FIG. 2 for purposes of explanation. In a particular embodiment, the components shown in FIG. 2 are used in combination with the components of FIG. 1 to provide a full-featured online gaming environment. The components of FIG. 2 that are common to FIG. 1 share common reference numbers.

The system of FIG. 2 shows two game consoles 102(1) and 102(2), security gateway 104 and statistics front door 124, as discussed above with respect to FIG. 1. Statistics front door 124 is coupled to a storage server 202, a statistics database 206, and a signature server 210. Storage server 202 controls the storage and retrieval of data, such as attachments associated with game ratings, in one or more storage databases 204. Storage server 202 communicates with signature server 210 and with game consoles 102 via security gateway 104.

Statistics front door 124 controls various functions related to maintaining statistics related to game play, such as leaderboards associated with various game programs. Statistics database 206 coupled to statistics front door 124 stores various statistics and other information used by statistics front door 124 and other components. For example, statistics database 206 maintains data associated with multiple leaderboards, such as player ratings, references to data (e.g., saved games or highlights) associated with a player's rating, and the like.

Name resolver 208 is used when data is stored across multiple storage devices. A data request from game console 102 is not typically aware of the storage facilities used by the online gaming system. Thus, name resolver 208 maps a generic identifier used by game console 102 to the actual storage location of the data. Additional details regarding name resolver 208 are provided below. Signature server 210 contains a set of keys used to secure communications between game consoles 102 and other components of the system. In one embodiment, statistics server 124 is unaware of name resolution issues handled by name resolver 208. Statistics server 124 builds references that include all of the metadata that name resolver 208 would use to locate the proper storage server, but the statistics server doesn't know how data is partitioned among different locations or different storage devices. When an game console 102 actually uploads or downloads attachments generated by statistics server 124, name resolver 208 will be contacted.

The data associated with online game ratings is not necessarily stored in the statistics service itself. Instead, the statistics service may keep a reference to the data which is stored in a separate storage service. The storage service may store data associated with online game ratings as well as other data.

Figure 3A:
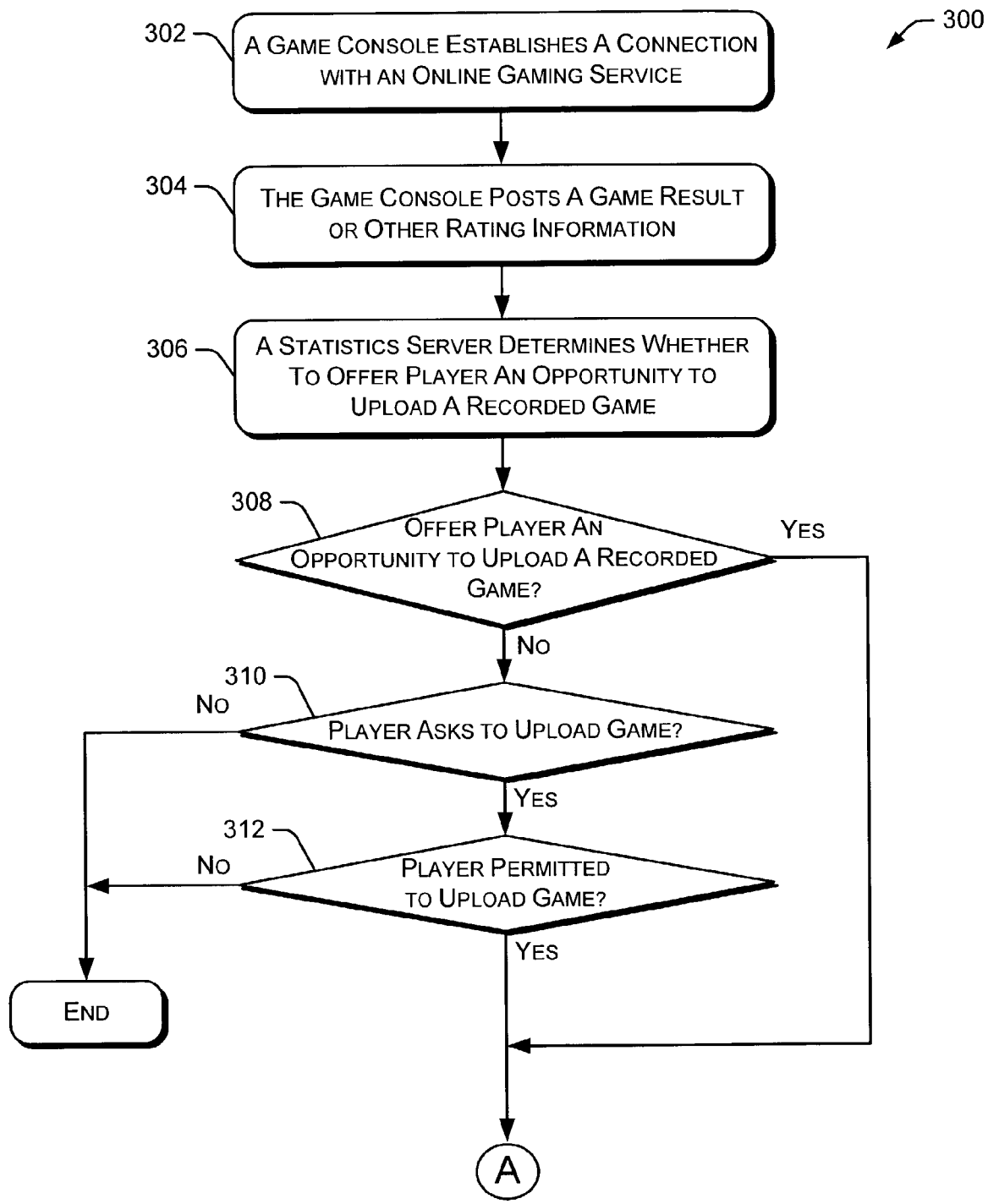
FIGS. 3A and 3B represent a flow diagram illustrating an embodiment of a procedure for associating data with online game ratings.
Figure 3B:
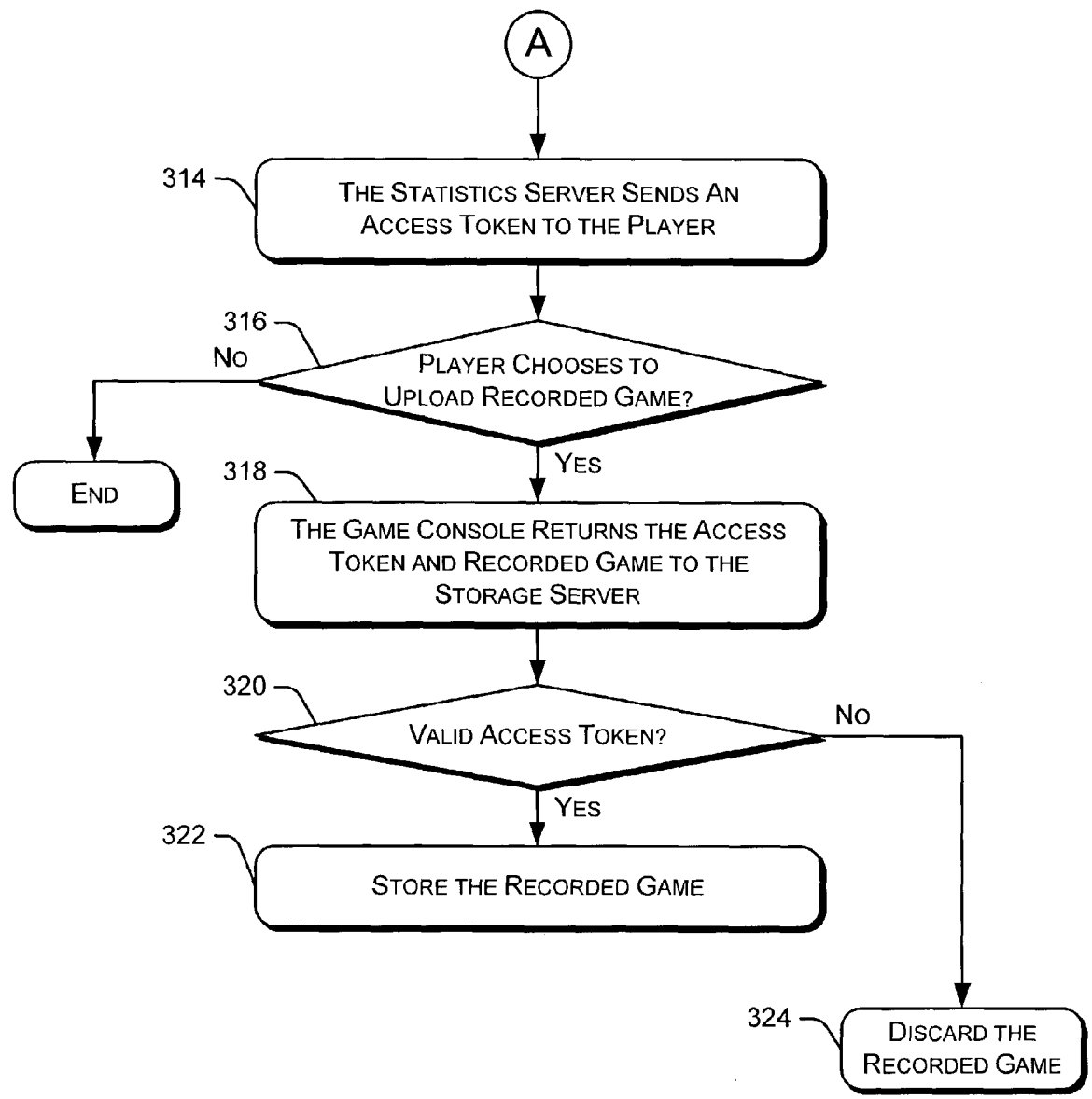

FIGS. 3A and 3B represent a flow diagram illustrating an embodiment of a procedure 300 for associating data with online game ratings. Initially, a game console establishes a connection with an online gaming service (block 302). The game console then posts a game result (such as a game score) or other information used to rate the player's performance to the statistics front door (block 304) or the statistics server. A statistics server determines whether to offer the player an opportunity to upload a recorded game (i.e., the recorded game associated with the posted game score) to be associated with the player's rating (block 306). A recorded game may also be referred to as a "ghost race", a "highlight", a "highlight race", or a "saved game". The statistics server may limit the number of recorded games that can be associated with a particular game to control the amount of storage space required for such recorded games. For example, the statistics server may allow recorded games to be associated with the top ten or top twenty ratings for a particular game (or the top 5% of all ratings). The number of recorded games that can be stored with a particular game may vary depending on the number of players submitting scores and/or the size of the typical recorded game data.

If the statistics server decides to offer the player an opportunity to upload the recorded game (block 308), the procedure branches to block 314 where the statistics server sends an access token to the player to be used in submitting the recorded game. If the statistics server decides not to offer the player an opportunity to upload the recorded game, the player may enter a request to upload the recorded game (block 310). A statistics server may allow a certain number of recorded games to be uploaded by players that do not otherwise qualify to upload the recorded game. If the player enters such a request, the procedure determines whether the player is permitted (e.g., by the statistics server) to upload the recorded game (block 312). If so, the procedure continues to block 314 where the statistics server sends an access token to the player to be used in submitting the recorded game. Otherwise, the procedure terminates.

From block 314, the game console determines whether the player has chosen to upload the recorded game (block 316). If not, the procedure terminates. If the player chooses to upload the recorded game at block 316, the game console returns the access token and the recorded game to the storage server (block 318). The storage server receives the access token and the recorded game and validates the access token (block 320). This validation is used to ensure that the recorded game sent by the game console is the proper recorded game (i.e., the recorded game that "earned" the access token). If the access token is valid, the recorded game is stored to a storage device (block 322). If the access token is not valid, the recorded game is discarded by the storage server (block 324).

To protect the integrity of the recorded game data being uploaded, any game data that has the potential to be an attachment is digitally signed by the game console player using signature server 210. This signature is tracked in the storage service along with the attachment data. Any time a game console user downloads an attachment from the storage service, it verifies the signature using the storage service. This approach allows signatures to be revoked in case a malicious attachment is uploaded and discovered at a later time. Since some game console users may have already downloaded the attachment when its malicious nature is discovered, requiring the game console users to validate the signature before the attachment is used allows improper content to be disabled even when game console users have a legitimate copy.

In the example of FIGS. 3A and 3B, the statistics server provides the player with an opportunity to upload a recorded game. In alternate embodiments, the game console automatically uploads the recorded game to the storage server if the statistics server wants to offer the recorded game to other players (e.g., the recorded game is a top score).

Recorded games and other saved data can be retrieved and downloaded and used by numerous players through an online gaming service from, for example, a game console, personal computer, or other device. Players can watch the recorded games or "ride along" during a replay of the recorded game to learn how the best players obtain their top scores. Additionally, with certain recorded games, players can compete against the recorded game to test or improve their own skills.

Particular examples discussed herein relate to storing saved game data associated with player ratings. However, in alternate embodiments, any type of data may be associated with player ratings, such as portions of a recorded game, a longest run in a football game, a biggest explosion, a clever golf shot, best bloopers (i.e., mistakes), and the like. Additionally, games could record a "highlight" film of particularly interesting items and make them available on leader boards. Sports games could compel players to play frequently by providing a highlight show where players can watch the best plays such as longest interception, longest home run, etc. Similarly, action games can record films for interesting events, such as largest explosions, most crashes in a given time period, etc.

Figures 4, 5:
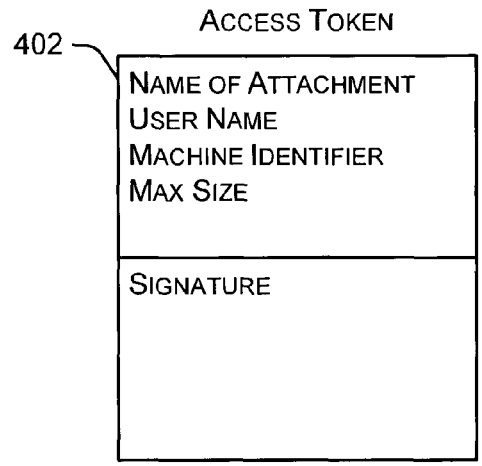
FIG. 4 illustrates an example of data contained in an access token.
FIG. 5 illustrates an example of data contained in a leaderboard associated with a particular game.

FIG. 4 illustrates an example of data contained in an access token 402. Access token 402 provides "permission" to a player (or game console user) to upload data to, for example, the storage server. Access token 402 is designed to prevent tampering by a player and provide assurances to the storage server that the statistics server granted permission for the upload. Access token 402 includes the name of the attached data file that the player is permitted to upload, the name of the player permitted to perform the data upload, an identifier associated with the machine that generated the data being uploaded, and the maximum size of the data that can be uploaded from the game console. Access token 402 also includes a digital signature obtained from the signature server by the statistics server granting the permission. This digital signature prevents the user from tampering with the data contained in the access token. Other access tokens may include other types of data, such as the operation permitted, the location of the file being uploaded, etc.

FIG. 5 illustrates an example of data contained in a leaderboard 500 associated with a particular game. In this example, leaderboard 500 is associated with an auto racing game and maintains a list of the best lap times. In other embodiments, other types of games may capture different types of information. Also, a leaderboard may capture multiple types of information, such as fastest lap, fastest three-lap race, fewest collisions, etc. The leaderboard information is typically available to all players associated with an online gaming service.

A first column 502 in leaderboard 500 identifies a particular ranking (e.g., 1-10). A second column 504 identifies a player name associated with the ranking. The player name may be a real name (e.g., Bob Smith) or a nickname (e.g., Master Gamer). A third column 506 identifies the player's best lap time that is at least partially responsible for the player's ranking. A fourth column 508 contains a reference identifier that identifies data (such as a recorded game or a best shot) associated with the player's ranking. For example, the reference identifier (abbreviated Ref. ID) may identify a recorded game in which the lap time identified in column 506 was produced. Other players can select a recorded game or other associated data using the reference identifier. In certain situations, there may be no reference identifier, meaning that there is no additional data associated with the particular ranking. In an alternate embodiment, the reference identifier is a uniform resource locator (URL).

A fifth column 510 identifies whether the data identified in the fourth column 508 is available for downloading and/or viewing. If the data identified by the reference identifier is available on, for example, the storage server, the fifth column 510 will indicate the availability of the data as "Yes" or "Y". However, if the data has been deleted, was never uploaded to the storage server, or is in the process of being uploaded to the storage server, the fifth column 510 will indicate the availability of the data as "No" or "N". Thus, a player can view the leaderboard and identify which attachments are available to download.

A sixth column 512 identifies a timestamp indicating the last time the player identified in column 504 played the game associated with leaderboard 500. The timestamp information is updated each time the, player reports a game result to the statistics server. This timestamp information is used to determine the age of statistical data. Further, the statistics server may "age out" old entries. In one embodiment, entries that were created by a player who has not played the game for 30 or 60 days may be removed from the leaderboard to provide spaces for players actively playing the game. In another embodiment, the following formula ages entries in leaderboard 500 based on the timestamp.

An example decay formula is provided below (m represents the number of months since the player's last game session.

$$RATING_{new} = \begin{cases} RATING_{old} * \left(1 - \frac{m}{12}\right), 0 \leq m < 12 \\ 0, m >= 12 \end{cases}$$

This formula will degrade the player's rating linearly over time until the player has been inactive for 12 months. After 12 months of inactivity by the player, the rating is set to zero and subsequently removed from the leaderboard. Alternate embodiments may use other types of decay formulas that reduce ratings over time.

Although leaderboard 500 illustrates the top ten players for a particular game, other leaderboards may illustrate any number of players, such as the top five, the top twenty, or the top 100.

Each row (i.e., rating) in leaderboard 500 may have multiple associated data attachments. For example, a particular rating in leaderboard 500 may have an associated recorded game and an associated audio file of a player's voice describing how they achieved their high score.

In an alternate embodiment, a subset of the players associated with an online gaming service, such as a group of friends or a club, may exchange attachments. Thus, a group of friends may post recorded games to a particular storage area (e.g., a friends leaderboard) for other friends to download and view or compete against. This allows two or more friends to play against each other even if they are not available to play at the same time.

Figure 6:
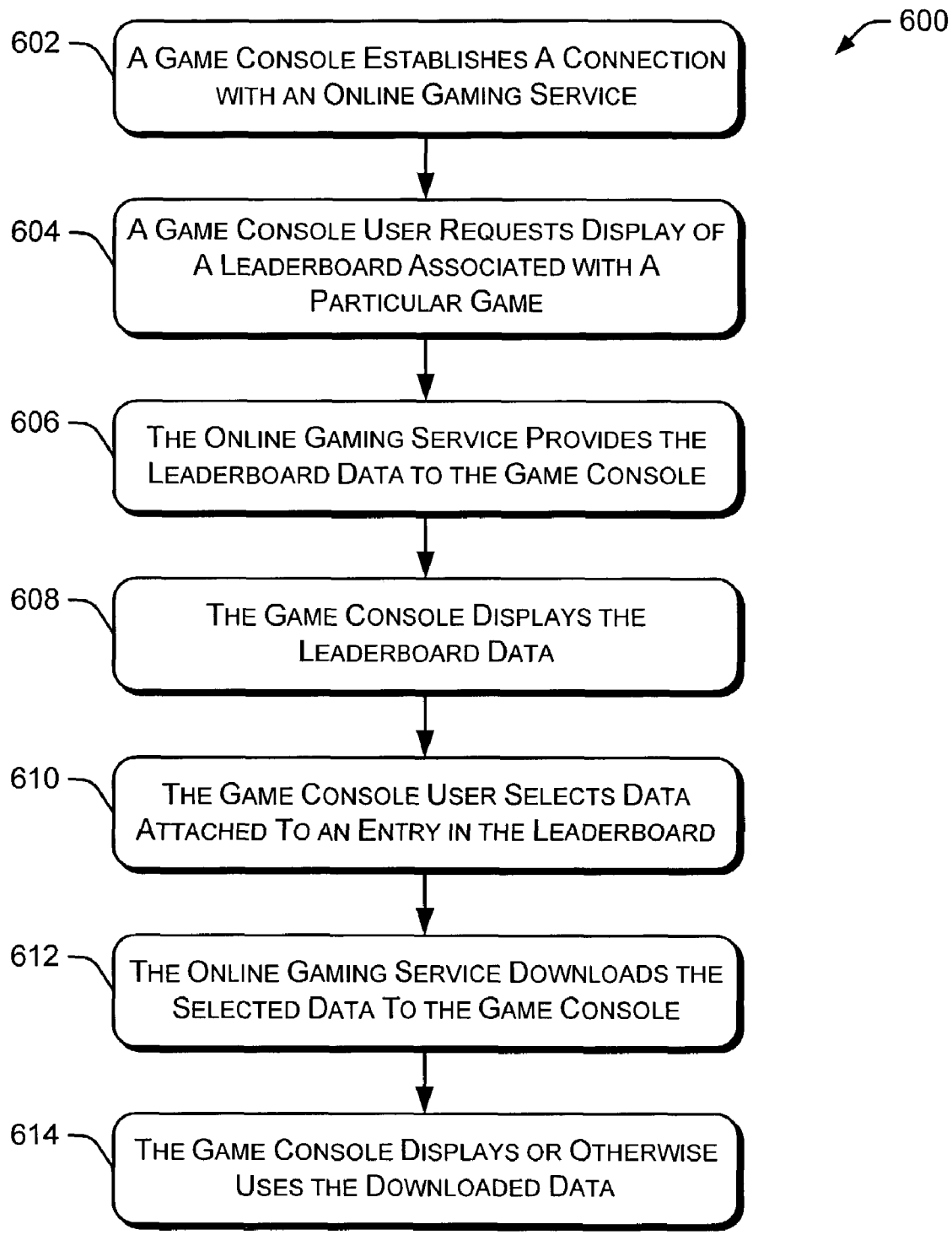
FIG. 6 is a flow diagram illustrating an embodiment of a procedure in which a game console retrieves data associated with a player's rating.

FIG. 6 is a flow diagram illustrating an embodiment of a procedure 600 in which a game console retrieves data associated with a player's rating. Initially, a game console establishes a connection with an online gaming service (block 602). The game console user (or player) requests display of a leaderboard associated with a particular game (block 604). In alternate embodiments, the game console user (or player) requests display of ratings of various friends that also use the online gaming system. This display of friends' ratings may contain information similar to that discussed above with respect to leaderboard 500 in FIG. 5.

At block 606, the online gaming service provides the leaderboard data to the game console. The game console then displays the received leaderboard data to the game console user (block 608). The game console user selects data attached to (or associated with) an entry in the leaderboard (block 610). The selected data may be a recorded game, favorite shot, etc. The online gaming service downloads the selected data to the game console (block 612). The game console then displays or otherwise utilizes the downloaded data (block 614). As mentioned above, the game console user may view recorded game data or game highlights to learn from the techniques of other players.

As mentioned above, name resolver 208 (FIG. 2) maps a generic identifier used by a game console to an actual storage location of the desired data. Data stored by the online gaming system may be stored on a variety of different storage systems in different geographic areas. Attachment data can be partitioned into subsets based on game programs, players' geographic area, etc. These different storage devices and storage locations need to be available to a game console user without requiring that the user understand the layout of the data storage architecture. Various other data-related functions, such as the addition of new data, migration of data between storage devices and/or storage locations, and reallocation of storage facilities should be transparent to the game console user as well as the game program itself. Since the game program can be redirected (e.g., by name resolver 208), the various functions mentioned above can occur without any modification of the game code.

By storing data across multiple data storage locations, data download time may be improved by downloading data from a storage location close to the game console user. Data can also be moved from one location to another without disruption to the game console user or requiring updates to the references identifying data stored in, for example, the statistics database. When the statistics service generates the reference for a new data attachment, it embeds information in the reference that identifies the particular game title used and the player responsible for the data attachment. This information can be used to partition the attachments across multiple data storage locations.

When the storage service is started, it queries a central configuration database to discover the groups of attachments for which it is responsible. A storage server determines from, for example, a reference identifier, whether the attachment is among the group it is responsible for or if the user needs to be directed to a different storage server.

In one embodiment, one data storage location is designated as the primary data storage location. All user requests for data are first sent to the primary data storage location. If the storage service at the primary data storage location redirects the user based on the reference identifier, the user will cache this information and, will direct subsequent data requests to the proper data storage location. If a group of data needs to be moved from one data storage location to another, after copying the data, the configuration data used by the name resolver is updated and the storage services will then redirect requests to the new data storage location.

Periodically, the online gaming service analyzes the data in the statistics database and identifies all valid attachments. This list of valid attachments is sent to the storage server, which deletes any stored attachments that are not on the list of valid attachments. Additionally, the storage server may identify attachments on the list that are not stored in the storage system, thereby allowing the statistics server to update its data. In an alternate embodiment, the statistics server generates a list of attachments that should be deleted. The storage server then deletes the attachments on the list from the storage system.

The various settings and parameters discussed herein can be modified in, for example, the statistics server and/or the storage server. These parameters and settings include criteria for determining whether to offer a player an opportunity to upload a recorded game, the number of rankings displayed on the leaderboard, and the like. Thus, parameters and settings can be modified after a particular game program has been shipped by the game manufacturer. These parameters and settings may be modified based on the popularity of the game or other factors. For example, if a particular game is very popular, an administrator of the online gaming service may increase the number of ratings that may have attached data.

Figure 7:
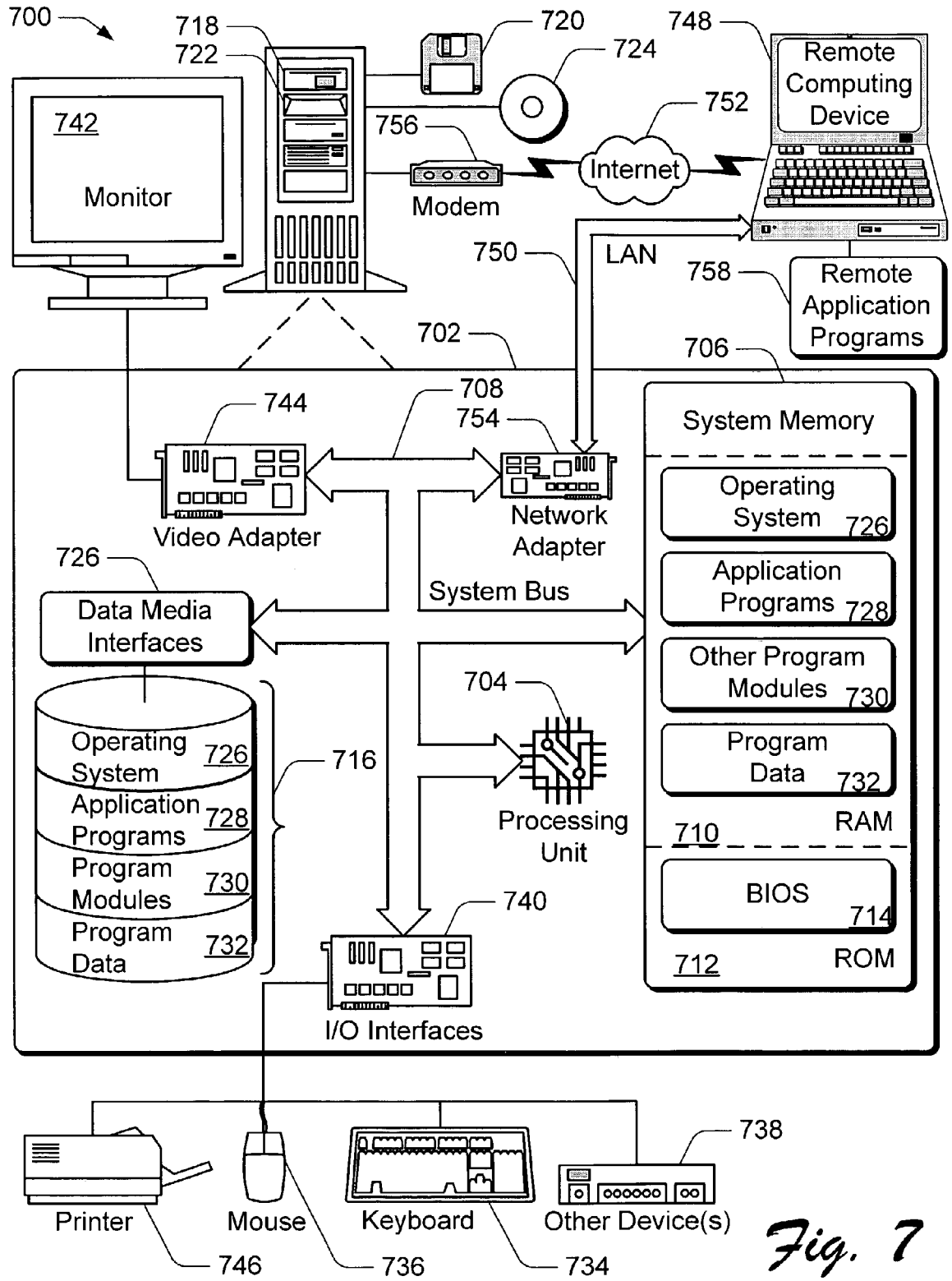
FIG. 7 illustrates a general computer environment, which can be used to implement the techniques described herein.

FIG. 7 illustrates a general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the exemplary computer environment 700.

Computer environment 700 includes a general-purpose computing device in the form of a computer 702. Computer 702 can be, for example, a statistics front door 124 or a security gateway 104 of FIG. 1, or a storage server 202 or a name resolver 208 of FIG. 2, or a signature server 210 of FIG. 2. The components of computer 702 can include, but are not limited to, one or more processors or processing units 704 (optionally including a cryptographic processor or co-processor), a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, game console, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 8:
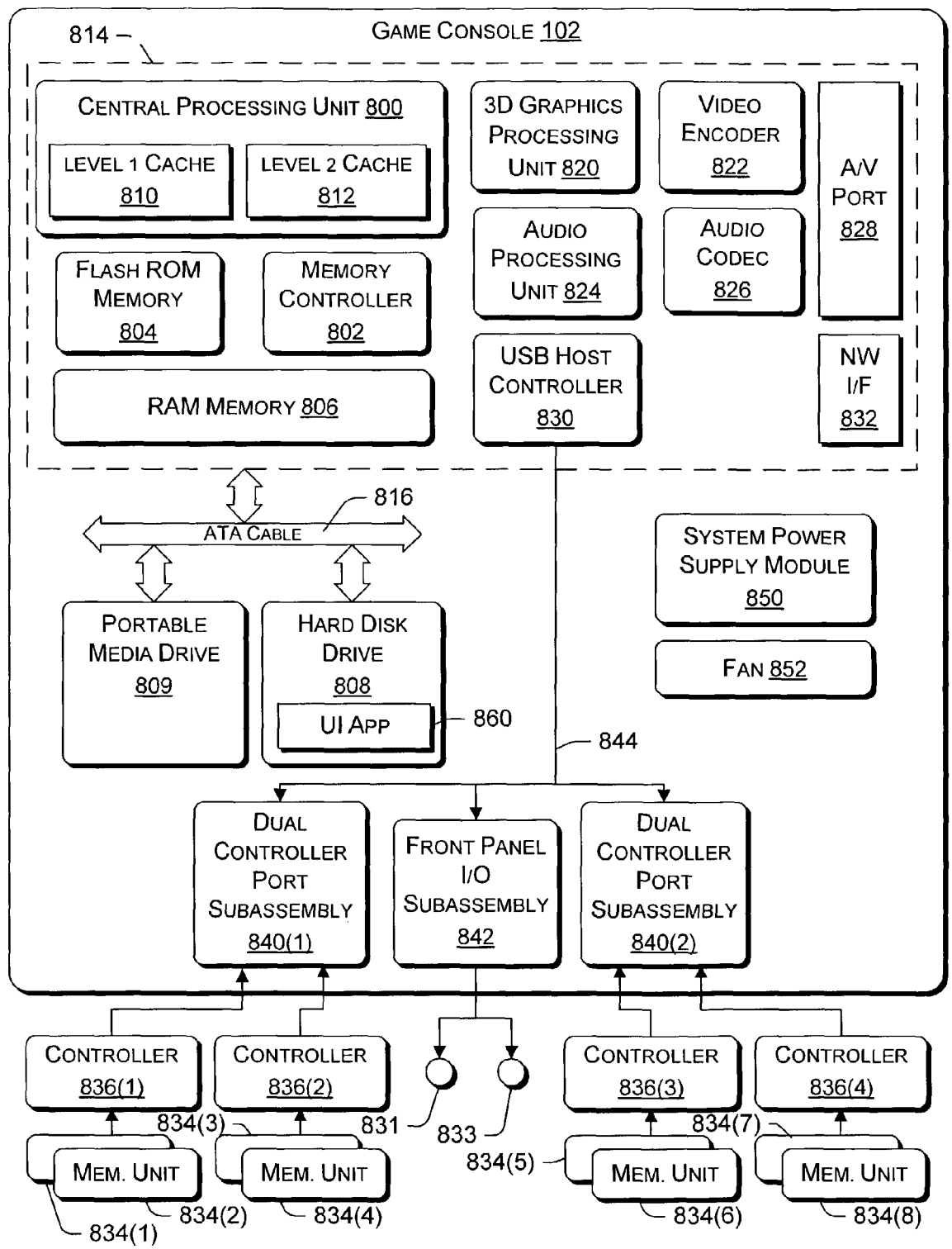
FIG. 8 shows functional components of a game console in more detail.

FIG. 8 shows functional components of a game console 102 in more detail. Game console 102 has a central processing unit (CPU) 800 and a memory controller 802 that facilitates processor access to various types of memory, including a flash ROM (Read Only Memory) 804, a RAM (Random Access Memory) 806, a hard disk drive 808, and a portable media drive 809. CPU 800 is equipped with a level 1 cache 810 and a level 2 cache 812 to temporarily store data and hence reduce the number of memory access cycles, thereby improving processing speed and throughput.

CPU 800, memory controller 802, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 800, memory controller 802, ROM 804, and RAM 806 are integrated onto a common module 814. In this implementation, ROM 804 is configured as a flash ROM that is connected to the memory controller 802 via a PCI (Peripheral Component Interconnect) bus and a ROM bus (neither of which are shown). RAM 806 is configured as multiple DDR SDRAM (Double Data Rate Synchronous Dynamic RAM) that are independently controlled by the memory controller 802 via separate buses (not shown). The hard disk drive 808 and portable media drive 809 are connected to the memory controller via the PCI bus and an ATA (AT Attachment) bus 816.

A 3D graphics processing unit 820 and a video encoder 822 form a video processing pipeline for high speed and high resolution graphics processing. Data is carried from the graphics processing unit 820 to the video encoder 822 via a digital video bus (not shown). An audio processing unit 824 and an audio codec (coder/decoder) 826 form a corresponding audio processing pipeline with high fidelity and stereo processing. Audio data is carried between the audio processing unit 824 and the audio codec 826 via a communication link (not shown). The video and audio processing pipelines output data to an A/V (audio/video) port 828 for transmission to the television or other display. In the illustrated implementation, the video and audio processing components 820-828 are mounted on the module 814.

Also implemented on the module 814 are a USB host controller 830 and a network interface 832. The USB host controller 830 is coupled to the CPU 800 and the memory controller 802 via a bus (e.g., PCI bus) and serves as host for the peripheral controllers 836(1)-836(4). The network interface 832 provides access to a network (e.g., Internet, home network, etc.) and may be any of a wide variety it of various wire or wireless interface components including an Ethernet card, a modem, a Bluetooth module, a cable modem, and the like.

The game console 102 has two dual controller support subassemblies 840(1) and 840(2), with each subassembly supporting two game controllers power button 831 and a media drive eject button 833, as well as any LEDs (light emitting diodes) or other indicators exposed on the outer surface of the game console. The subassemblies 840(1), 840(2), and 842 are coupled to the module 814 via one or more cable assemblies 844.

Eight memory units 834(1)-834(8) are illustrated as being connectable to the four controllers 836(1)-836(4), i.e., two memory units for each controller. Each memory unit 834 offers additional storage on which games, game parameters, and other data may be stored. When inserted into a controller, the memory unit 834 can be accessed by the memory controller 802.

A system power supply module 850 provides power to the components of the game console 102. A fan 852 cools the circuitry within the game console 102.

A console user interface (UI) application 860 is stored on the hard disk drive 808. When the game console is powered on, various portions of the console application 860 are loaded into RAM 806 and/or caches 810, 812 and executed on the CPU 800. Console application 860 presents a graphical user interface that provides a consistent user experience when navigating to different media types available on the game console.

Game console 102 implements a cryptography engine to perform common cryptographic functions, such as encryption, decryption, authentication, digital signing, hashing, and the like. The cryptography engine may be implemented as part of the CPU 800, or in software stored on the hard disk drive 808 that executes on the CPU, so that the CPU is configured to perform the cryptographic functions. Alternatively, a cryptographic processor or co-processor designed to perform the cryptographic functions may be included in game console 102.

Game console 102 may be operated as a standalone system by simply connecting the system to a television or other display. In this standalone mode, game console 102 allows one or more players to play games, watch movies, or listen to music. However, with the integration of broadband connectivity made available through the network interface 832, game console 102 may further be operated as a participant in online gaming, as discussed above.

It should be noted that although the game console discussed herein is described as a dedicated game console (not a general-purpose PC running computer games), the game console may also incorporate additional functionality. For example, the game console may include digital video recording functionality so that it can operate as a digital VCR, the game console may include channel tuning functionality so that it can tune and decode television signals (whether they be broadcast signals, cable signals, satellite signals, etc.), and so forth. Further, in alternate embodiments, the game console is replaced with a set top box or other computing device.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, comprising:
   at a statistics server, receiving an access token including a digital signature and a game result from a game console;
   determining, by the statistics server, a rating for the game result;
   if the rating for the game fails to meet a predetermined criteria, preventing, by the statistics server, receiving a recorded game associated with the game result wherein the recorded game is a recording of a previously played game;
   validating, by the statistics server, the access token including the digital signature; and
   if the rating for the game result meets the predetermined criteria, receiving, by the statistics server, the recorded game associated with the game result from the game console and if the access token including the digital signature is valid attaching the recorded game to the rating, wherein the recorded game includes an audio file containing a recorded voice of a user of the game console, and wherein other players can access the recorded game through the online gaming service.

2. A method as recited in claim 1 wherein the game result is a game score.

3. A method as recited in claim 1 wherein the predetermined criteria is a rating in the top n scores.

4. A method as recited in claim 1 wherein receiving a recorded game is in response to a request sent to the game console.

5. A method as recited in claim 1 further comprising providing a list of recorded games available for download to a requesting player.

6. A method as recited in claim 1 further comprising providing a list of recorded games available for download to a requesting game console.

7. A method as recited in claim 1 further comprising modifying the predetermined criteria.

8. A method as recited in claim 1 further comprising attaching additional game-related data to the rating.

9. A method as recited in claim 1 further comprising saving the game result and the attached recorded game in a storage device.

10. A method as recited in claim 1 further comprising deleting the game result and the attached recorded game after a predetermined period of inactivity by the game console user.

11. A method as recited in claim 1 further comprising reducing the rating of the game result over a period of time.

12. A method as recited in claim 1 further comprising saving the game result and an identifier associated with the recorded game in a leaderboard.

13. One or more computer-readable memories containing a computer program that is executable by a processor to perform the method recited in claim 1.

14. A method, comprising:
   at a statistics server, receiving a game result from a game console;
   determining, by the statistics server, whether to allow the game console user to upload game-related data associated with the game result;
   if the game console user is not allowed to upload the game-related data:
   preventing, by the statistics server, the user from uploading the game-related data; and
   if the game console user is allowed to upload the game-related data:
   sending, by the statistics server, an access token including a digital signature to the game console;
   receiving, by the statistics server, the access token and the game-related data associated with the game result, wherein the game-related data includes an audio file containing a recorded voice of a user of the game;
   validating, by the statistics server, the access token including the digital signature; and
   if the access token including the digital signature is valid, associating, by the statistics server, the game-related data with the game result, wherein other users can access the game-related data through an online gaming service.

15. A method as recited in claim 14 further comprising determining a rating for the game result.

16. A method as recited in claim 15 further comprising associating the game-related data with the rating.

17. A method as recited in claim 14 wherein the game result is a game score.

18. A method as recited in claim 14 wherein the access token includes a name of the game-related data.

19. A method as recited in claim 14 wherein the access token includes an identity of the game console user.

20. A method as recited in claim 14 wherein the access token includes a game console identifier.

21. A method as recited in claim 14 wherein the access token includes a maximum size of the game-related data.

22. A method as recited in claim 14 wherein the game-related data includes a recorded game and wherein the recorded game is a recording of a previously played game.

23. A method as recited in claim 14 wherein the game-related data includes at least one highlight from a game.

24. One or more computer-readable memories containing a computer program that is executable by a processor to perform the method recited in claim 14.

25. A method, comprising:
at a statistics server, receiving a game score from a game console;
determining, by the statistics server, a rating for the game score;
entering, by the statistics server, the rating in a leaderboard;
if the rating satisfies a predetermined criteria:
receiving, by the statistics server, an access token including a digital signature and the game-related data associated with the game score, wherein the game-related data includes an audio file containing a recorded voice of a user of the game console;
validating, by the statistics server, the access token including the digital signature;
if the access token including the digital signature is valid:
entering, by the statistics server, a reference identifier in the leaderboard, wherein the reference identifier is associated with the game-related data; and
entering, by the statistics server, an indicator in the leaderboard, wherein the indicator is associated with the game-related data and indicates whether the game-related data is available for download; and
if the rating fails to satisfy the predetermined criteria, discarding, by the statistics server, the game-related data associated with the game score.

26. A method as recited in claim 25 wherein users of the online gaming service can access the game-related data through the leaderboard.

27. A method as recited in claim 25 wherein determining a rating for the game score includes comparing the game score to other game scores in the leaderboard.

28. A method as recited in claim 25 wherein the leaderboard is associated with a particular game program.

29. A method as recited in claim 25 wherein the predetermined criteria is a rating in the top n percent of all ratings.

30. An apparatus, comprising:
means for receiving a game result at a statistics server from a game console;
means for determining a rating associated with the game result;
means for receiving an access token including a digital signature and a recorded game associated with the game result if the rating associated with the game result meets a predetermined criteria wherein the recorded game is a recording of a previously played game;
means for discarding the recorded game associated with the game result if the rating associated with the game result fails to meet the predetermined criteria;
means for validating the access token including the digital signature;
means for attaching the recorded game to the rating if the access token including the digital signature is valid, wherein other players can access the recorded game through an online gaming service; and
means for attaching an audio file containing a recorded voice of a user of the game console to the rating.

31. An apparatus as recited in claim 30 further comprising means for attaching additional game-related data to the rating.

32. An apparatus as recited in claim 30 further comprising means for storing the recorded game and an identifier associated with the recorded game.

33. One or more computer-readable media having stored thereon a computer program that, when executed by one or more processors, causes the one or more processors to:
receive game results at a statistics server and from a game console;
determine, by the statistics server, a rating associated with the game results;
if the rating exceeds a predetermined threshold value:
digitally sign, by the statistics server, an access token;
send, by the statistics server, the signed access token to the game console;
receive, by the statistics server, the signed access token and game-related data associated with the rating, wherein the game-related data includes an audio file containing a recorded voice of a user of the game console;
validate, by the statistics server, the signed access token; and
if the signed access token is valid, associate, by the statistics server, the game-related data with the rating, wherein other users of an online gaming service can download the game-related data;
if the rating fails to exceed a predetermined threshold value, discarding, by the statistics server, the game-related data associated with the rating;
analyzing a plurality of game related data at the statistics server to identify valid game related data; and
deleting, by the statistics server, any invalid game related data.

34. One or more computer-readable media as recited in claim 33 wherein the game related-data is a recorded game and wherein the recorded game is a recording of a previously played game.

* * * * *